Dec. 25, 1962   J. E. SPINDLER   3,069,834
RAKE WHEEL PROVIDED AT ITS CIRCUMFERENCE WITH RESILIENT TINES
Filed Nov. 27, 1959   3 Sheets-Sheet 2

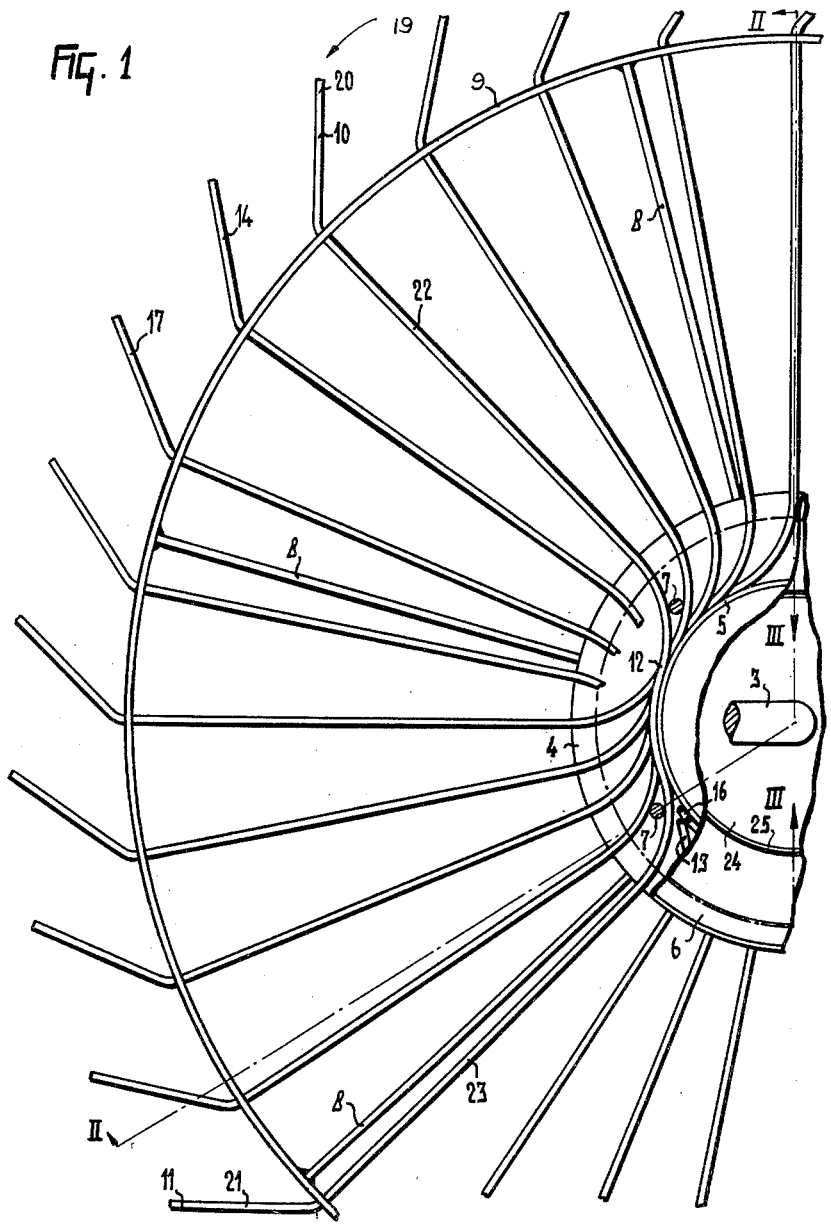

United States Patent Office 3,069,834
Patented Dec. 25, 1962

3,069,834
RAKE WHEEL PROVIDED AT ITS CIRCUMFERENCE WITH RESILIENT TINES
John E. Spindler, Minety Malmesbury, England, assignor to C. van der Lely N.V., Maasland, Netherlands, a Dutch limited-liability company of the Netherlands
Filed Nov. 27, 1959, Ser. No. 855,805
Claims priority, application Netherlands Dec. 4, 1958
20 Claims. (Cl. 56—377)

The invention relates to rake wheels of the type circumferentially provided with resilient tines, in which a first tine is coupled to a second tine by means of a connecting piece to form a pair.

The invention has as an object the arranging of a tine in a rake wheel so that the life of the tine is enhanced.

In accordance with the invention this can be achieved by arranging, at the circumference of a wheel, between the above-noted first and second tine, at least three further tines, the piece connecting the tines being arranged in the wheel so as to be freely rotatable.

The invention furthermore relates to a rake wheel of the above-noted type, in which the object of the invention is attained by mounting a plurality of tine pairs groupwise, the pairs of tines of one group being shaped in the same form, two tines being provided between two interconnected tines, each two tines being associated with a different tine pair. By constructing the tines in the aforesaid manner, there is obtained a smooth deflection of the tines because each tine has a large portion which is capable of deforming upon deflection. It is furthermore insured that a rake wheel can be manufactured in a simple manner and can be mounted readily.

In a particularly advantageous embodiment of the invention two interconnected tines are offset relatively to each other by an angle of more than 45° at the periphery of the rake wheel. This provides the advantage that the tines and the connecting pieces thereof need not have comparatively sharply bent-over portions, so that the risk of breakage is reduced. It may furthermore be insured in this manner that the tines of one pair do not simultaneously touch the ground during raking, so that a more favorable loading of the tines is obtained.

Particularly in the case in which two interconnected tines are offset by an angle of at least about 180° relatively to each other at the circumference of the rake wheel, the two interconnected tines and their connecting piece possibly having the shape of an S, a long connecting piece and hence a flexible tine will be obtained.

Another particularly advantageous construction of the rake wheel is obtained if the distance of the connecting piece between two tines from the rotary axis of the rake wheel is less than one third of the radius of the rake wheel.

Mounting of the rake wheel is carried out readily if the tines are arranged groupwise in the rake wheel, the number of groups being equal to 360 divided by twice the angle between two interconnected tines.

The invention will be described more fully with reference to two advantageous embodiments, with reference to the accompanying drawing in which:

FIG. 1 is a front view of part of a rake wheel according to a first embodiment of the invention.

Figure 3:
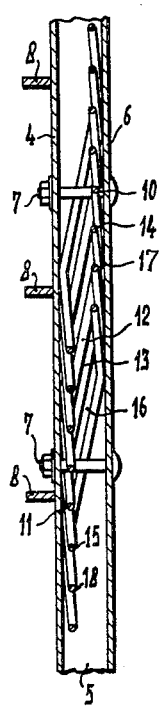
FIG. 3 is a sectional view taken on line III—III of FIG. 1, the hub portion shown being developed in the plane of the drawing.
Figure 2:
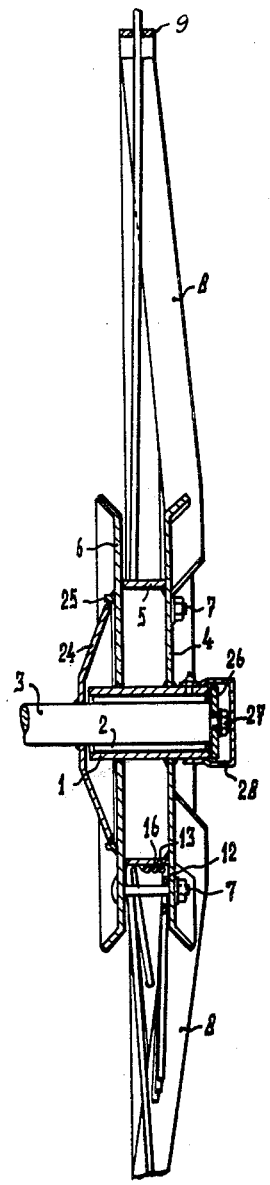
FIG. 2 is a sectional view taken on line II—II of FIG. 1.

The rake wheel shown in FIGS. 1 to 3 comprises a bearing 1, which is arranged on a crank 3 by means of a needle bearing 2 (FIG. 2).

To the bearing 1 is welded a plate 4, which is at right angles to the rotary axis of the bearing 1 and of the rake wheel. The plate 4 has connected thereto a cylindrical sleeve 5, which is concentric to the axis defined by crank 3. Parallel to the plate 4 is provided a plate 6, which loosely surrounds the bearing 1 and which is connected by bolts 7 with the plate 4, the plate 6 engaging one side of the cylindrical sleeve 5. Since the cylindrical sleeve 5 is located within the outer circumference of the plates 4 and 6, which are of the same dimensions, there is an annular gap between the plates 4 and 6 outside of the sleeve 5, in which gap connecting pieces for tines can be arranged, as will be described hereinafter.

With the aid of strip-shaped spokes 8 a felly 9 is connected to the plate 4. The felly lies centrally over the gap between the plates 4 and 6. The spokes 8 extend from the felly towards the outer side of the plate 4 and are thus at an angle to a plane which lies at right angles to the rotary axis of the rake wheel.

In the felly 9 are provided holes, in which tines 10 and 11 are journalled. The tines 10 and 11 are connected with each other by a connecting piece 12. This connecting piece 12 is located in the gap formed by the sleeve 5 and the plates 4 and 6 and extends from the plate 6 towards the plate 4 (see FIG. 3), so that this connecting piece engages the periphery of the sleeve 5 substantially in the form of a spiral. The portion of the connecting piece 12 engaging the surface of the sleeve 5 extends through an angle of more than 25°, in this embodiment, about 40° about the rotary axis of the rake wheel. The piece 12 is located at the side of a connecting piece 13, which connects two tines 14 and 15 with each other, whereas the piece 13 itself is located at the side of a connecting piece 16, which connects two tines 17 and 18 with each other. Thus seven further tines are provided between the tines 10 and 11, each of these seven tines being united with a further tine by its own connecting piece. The tines 15 and 18, which are connected with the tines 14 and 17 are not located in the angle formed between the tines 10 and 11. The tines 10 and 11 are offset relatively to each other by an angle which amounts to more than 45° and which is about 90° in this embodiment. Thus a group of eight pairs of tines is formed, of which the connecting pieces are located side by side.

The tines 10 and 11 have portions 20 and 21, which extend beyond the felly 9. These portions 20 and 21 point backwards viewed in the direction of rotation 19 of the rake wheel. The portions 22 and 23, located inside the felly, are radial to the axis of rotation of the rake wheel and constitute axes of rotation for the tine portions 20 and 21. Torsion may occur in the portions 22 and 23 when the tine portions 20 and 21 deflect.

The tines of the rake wheels, of which approximately half the number is shown in FIG. 1, constitute two groups, of which each group forms 180° of the rake wheel plane. The number of tines in each group is determined by the angle between the interconnected tines. Each group lies in a sector of which the angle is approximately twice the angle between two radial portions 22 and 23 of the tines. The number of groups is thus equal to 360 divided by twice the angle between two interconnected tines.

The connecting piece 12 of one pair of tines 10 and 11 is located between the plates 4 and 6 and the other connecting pieces of a group so that the said portion is freely rotatable about its own axis, and only the frictional resistance owing to the contact with the other connecting pieces need be overcome. One pair of tines is, apart from the support provided by the connecting piece, only pivotably supported in the holes of the felly 9, through which the tines extend.

The bolts 7, which connect the plates 4 and 6 which are spaced apart by a distance exceeding twice the thickness of a tine, are capable of reducing to a certain extent a radial movement of the connecting pieces of the tine pairs.

The connecting pieces are located at a distance from the rotary axis of the wheel, which is smaller than one third of the radius of the rake wheel, so that the tine portions, for example, 22 and 23 may be long and each tine is readily capable of deflecting, which is moreover enhanced by the fact that the connecting pieces of the tine pairs are not tightly clamped.

In order to prevent the rake wheel from sliding along the shaft 3, a hood 24 is arranged on one side of the bearing on the shaft 3. The periphery of this hood is arranged inside an annulus 25, which is provided on the plate 6. On the other side of the bearing 1 provision is made of an end plate 26, which is secured to the shaft 3 by means of a bolt 27. The plate 26 and the bolt 27 are covered by a screening hood 28. The hood 24, together with the annulus 25 and the hood 28, is capable of preventing crop from getting in between rotating and stationary parts during the rotation of the rake wheel about the shaft 3.

Figure 4:
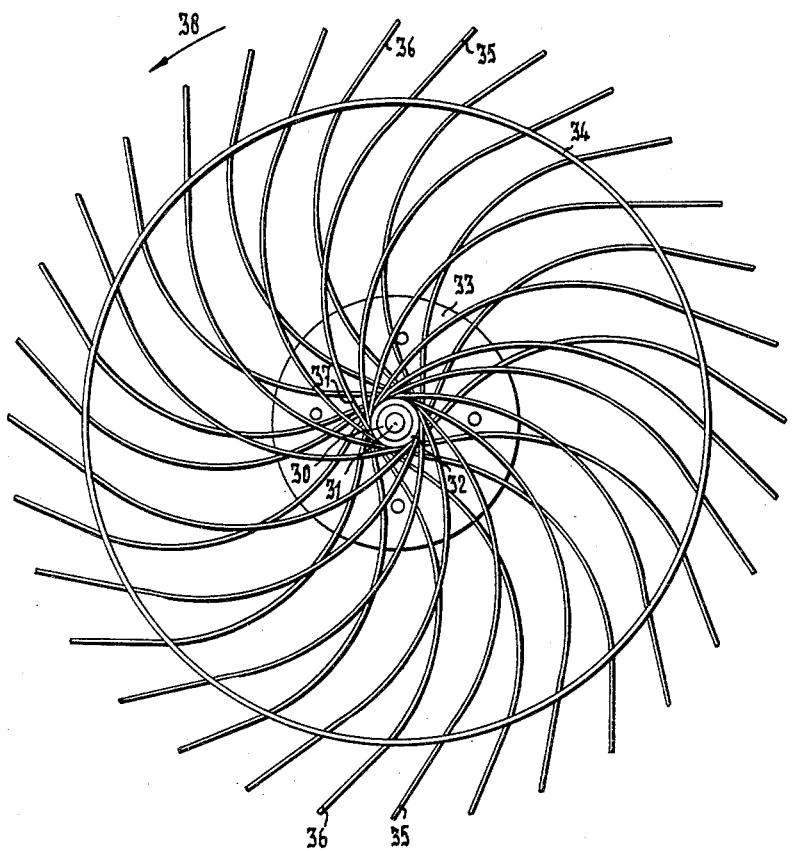
FIG. 4 is a side view of a second embodiment of the invention.

FIG. 4 shows a rake wheel, in which the tines and their connecting pieces are shaped mainly in the form of an S. The fastening method for these tines corresponds to that of the tines of the first embodiment, so that this fastening is not shown in detail. The rake wheel according to this embodiment comprises a bearing 30, which is adapted to turn about a shaft 31. The bearing 30 is provided with a sleeve 32, which corresponds with the sleeve 5 of the first embodiment. On either side of the sleeve 32 provision is made of plates, which, similar to the plates 4 and 6 of the first embodiment, provide a wide gap in which the connecting pieces of the pairs of tines can be arranged. Of these two plates only one plate, i.e. the plate 33 is shown, whereas the other plate is omitted for clarity.

The wheel comprises a felly 34, which is provided with holes, through which tines 35 and 36 extend. Each tine 35 is connected with a tine 36 by means of a connecting piece 37. A tine 35 and a tine 36, which constitute together one pair, are offset relatively to each other by about 180° about the rotary axis of the rake wheel. The connecting piece 37 of each pair of tines engages the surface of the sleeve 32. Also in this embodiment the connecting piece between two tines is arranged obliquely in the groove formed by the plate 33, the plate which is not shown and the sleeve 32. As shown in the elevation of FIG. 4, all tines 35 are located before the tines 36, since the connecting pieces 37, engaging the tines 35, are in contact with the plate not shown, whereas the connecting pieces 37, engaging the tines 36, are in contact with the plate 33. Each pair of tines 35 and 36 is integral with the connecting piece 37, the tines with the connecting piece being shaped in the form of an S. The central portion of the connecting piece 37 is substantially straight, so that it engages the surface of the sleeve 32 only over a small part.

Also in this embodiment the portions of the tines extending beyond the felly 34 point backwards, viewed in the direction of rotation of the wheel. The connecting pieces 37 of each tine pair are arranged in the gap formed by the plate 33, the plate not shown and the sleeve 32 so that the said pieces are capable of turning about their own longitudinal axes. Each tine 35 and 36 is therefore capable of deflecting readily, since the tine portion beyond the felly is readily capable of turning about the tine portion inside the felly. Since only one tine of a tine pair can be in contact with the ground at a time, the load of one tine is favorable. Also in the preceding embodiment, in which the tines of each pair are offset by an angle of about 90° relatively to each other on the circumference of the wheel, usually only one tine of each pair will be loaded more heavily, so that also in this embodiment the load of each tine is favorable. Since the tine pairs of the two embodiments are constructed so that no sharply bent-over parts are employed, the tines have a great resistance to breakage.

The rake wheels in the embodiments shown can be manufactured in a simple manner and each rake wheel can be readily mounted, since the tine pairs are all shaped in substantially the same form.

What I claim is:

1. A rake wheel comprising means defining an axis of rotation, said means being provided with an annular gap concentric with said axis, tines arranged in pairs, and connecting means on the first said means and connecting the tines of each pair, said connecting means each being rotatably positioned in said gap, the tines of each pair being offset by an angle of at least forty-five degrees.

2. A wheel as claimed in claim 1 wherein said connecting means are arranged in parallel contacting relationship oblique to said axis.

3. A wheel as claimed in claim 1 comprising a felly concentric with said axis, and strips connecting said felly to said means.

4. A wheel as claimed in claim 3 wherein said wheel has a determinable direction of rotation and said tines extend through said felly and incline rearwardly relative to said direction.

5. A wheel as claimed in claim 1 wherein said means includes a cylindrical sleeve concentric with said axis and plates on opposite sides of and confining said sleeve.

6. A wheel as claimed in claim 1 wherein each said pair of tines and the associated connecting member is in the shape of an S.

7. A wheel as claimed in claim 1 comprising a crank supporting said means.

8. A wheel as claimed in claim 1 comprising a felly concentric with said axis and supporting said tines, and strips oblique to said axis and connecting said felly to said means.

9. A wheel as claimed in claim 1 wherein the tines of each pair are spaced axially along said axis by said connecting means.

10. A rake wheel comprising rotatable means, pairs of tines, and connecting means operatively associated with said rotatable means and connecting the tines of said pairs in axially spaced relation.

11. A wheel as claimed in claim 10 wherein said rotatable means defines an axis of rotation and said connecting means each consists of a member aligned obliquely of said axis.

12. A wheel as claimed in claim 10 wherein the tines of each pair are offset by an angle of at least forty-five degrees.

13. A rake wheel comprising rotatable means defining an axis of rotation, a felly concentric with said axis, tines on said means and extending through said felly, said felly defining a plane perpendicular to said axis, and strips inclined to said plane and connecting said felly to said means.

14. A wheel as claimed in claim 13 wherein said means includes a cylindrical bearing and said wheel further comprises a crank extending through said bearing, an end plate fixed to said crank, and a plate encircling said crank and sandwiching said bearing against said end plate.

15. A rake wheel comprising a rotatable cylindrical sleeve, pairs of tines, and connecting members connecting the tines of each pair and extending arcuately along said cylindrical sleeve.

16. A wheel as claimed in claim 15 wherein said sleeve defines an axis and said members are oblique to said axis.

17. A wheel as claimed in claim 16 wherein said members are in parallel contacting relationship.

18. A wheel as claimed in claim 15 wherein there are at least three tines between each pair of tines.

19. A wheel as claimed in claim 15 wherein each connecting member defines an axis on which it is rotatable.

20. A rake wheel comprising circumferential resilient tines arranged in pairs, and connecting means on the wheel, the tines of each pair being united by said connecting means such that the tines of a pair are offset relative to each other at the circumference of the rake wheel so that during operation when one of the tines of a pair touches the ground, the other one will be free of the ground, said connecting member being rotatable in the wheel.

References Cited in the file of this patent

UNITED STATES PATENTS

| | | |
|---|---|---|
| 239,250 | Hitchock | Mar. 22, 1881 |
| 2,867,073 | Van der Lely et al. | Jan. 6, 1959 |
| 2,874,529 | Van der Lely et al. | Feb. 24, 1959 |
| 2,908,130 | Van der Lely et al. | Oct. 13, 1959 |
| 2,909,024 | Van der Lely et al. | Oct. 20, 1959 |

FOREIGN PATENTS

| | | |
|---|---|---|
| 674,797 | Great Britain | July 2, 1952 |